United States Patent
Krishnan et al.

(10) Patent No.: US 7,296,265 B1
(45) Date of Patent: Nov. 13, 2007

(54) CLASS LOADING IN A VIRTUAL MACHINE FOR A PLATFORM HAVING MINIMAL RESOURCES

(75) Inventors: Venkatesh Krishnan, Sunnyvale, CA (US); Geetha Manjunath, Bangalore (IN); Kommarahalli S. Venugopal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1184 days.

(21) Appl. No.: 09/264,756

(22) Filed: Mar. 9, 1999

(51) Int. Cl.
*G06F 9/44* (2006.01)

(52) U.S. Cl. ............... 717/166; 707/2; 707/100; 707/206; 709/217; 718/1

(58) Field of Classification Search ............... 709/100, 709/1, 105, 206; 707/2, 100, 206; 717/148
See application file for complete search history.

(56) References Cited

U.S. PATENT DOCUMENTS

| | | | | |
|---|---|---|---|---|
| 4,633,387 A | * | 12/1986 | Hartung et al. | ............ 709/105 |
| 5,636,355 A | * | 6/1997 | Ramakrishnan et al. | |
| 5,787,431 A | * | 7/1998 | Shaughnessy | ............ 707/100 |
| 5,848,423 A | * | 12/1998 | Ebrahim et al. | ............ 707/206 |
| 5,895,488 A | * | 4/1999 | Loechel | |
| 5,920,725 A | * | 7/1999 | Ma et al. | |
| 5,999,732 A | * | 12/1999 | Bak et al. | ............ 717/148 |
| 6,055,526 A | * | 4/2000 | Ambroziak | ............ 707/2 |
| 6,134,583 A | * | 10/2000 | Herriot | |
| 6,295,643 B1 | * | 9/2001 | Brown et al. | ............ 717/148 |

* cited by examiner

*Primary Examiner*—Dustin Nguyen

(57) ABSTRACT

A virtual machine with mechanisms for class loading and class structure management in a device having limited file system and/or memory resources. The virtual machine includes a class loader that obtains one or more of a set of predefined classes from a network server, thereby reducing or eliminating the need for a local file system in the device. The class loader stores the predefined classes into a class structure in memory in the device. The virtual machine further includes a memory manager that purges selected ones of the predefined classes from the class structure so as to optimize the use of the memory consumed by the predefined classes in the class structure.

27 Claims, 4 Drawing Sheets

CLASS LOADING IN A VIRTUAL MACHINE FOR A PLATFORM HAVING MINIMAL RESOURCES

BACKGROUND OF THE INVENTION

1. Field of Invention

The present invention pertains to the field of processing systems. More particularly, this invention relates to class loading by a virtual machine.

2. Art Background

Computer systems and devices having embedded processing resources typically conform to one of a variety of differing architectures. Each architecture is usually defined by a particular instruction set, hardware register set, and memory arrangement, etc. An architecture may also be referred to as a hardware platform for software execution. Software such as application programs which are written or compiled to be executed on a particular hardware platform may be referred to as native code. An application program in the native code of a particular hardware platform usually does not run on other non compatible hardware platforms.

Some software environments enable application programs to execute on a variety of differing hardware platforms. Typically, such a software environment provides a set of predefined services which are specified in terms of application programming interfaces (APIs). Such a software environment is commonly implemented in an object-oriented programming language in which the predefined services are implemented as predefined classes.

One example of such a software environment is a Java virtual machine. A typical Java virtual machine supports a set of predefined classes. Typically, a Java virtual machine includes a class loader that loads the predefined classes into memory as needed when executing a Java application program. Prior java virtual machines typically load the predefined classes from class libraries contained in a local or a remote file system.

Unfortunately, such class loading may limit the applicability of such a software environment. For example, such a software environment may have limited applicability to embedded systems which may have little or no file system resources for storing the class libraries. In addition, the costs of providing the network access resources needed to load classes from remote class libraries and/or the costs of providing network servers to hold the remote class libraries may be prohibitively high for embedded systems.

SUMMARY OF THE INVENTION

A virtual machine is disclosed with mechanisms for class loading and class structure management in a device having limited file system and/or memory resources. The virtual machine includes a class loader that obtains one or more of a set of predefined classes from a network server, thereby reducing or eliminating the need for a local file system in the device. The class loader stores the predefined classes into a class structure in memory in the device. The virtual machine further includes a memory manager that purges selected ones of the predefined classes from the class structure so as to minimize an amount of the memory consumed by the predefined classes in the class structure and to minimize class loading activities via a network. The class loader uses network prevalent mechanisms such as HTTP to minimize costs of network class loading.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
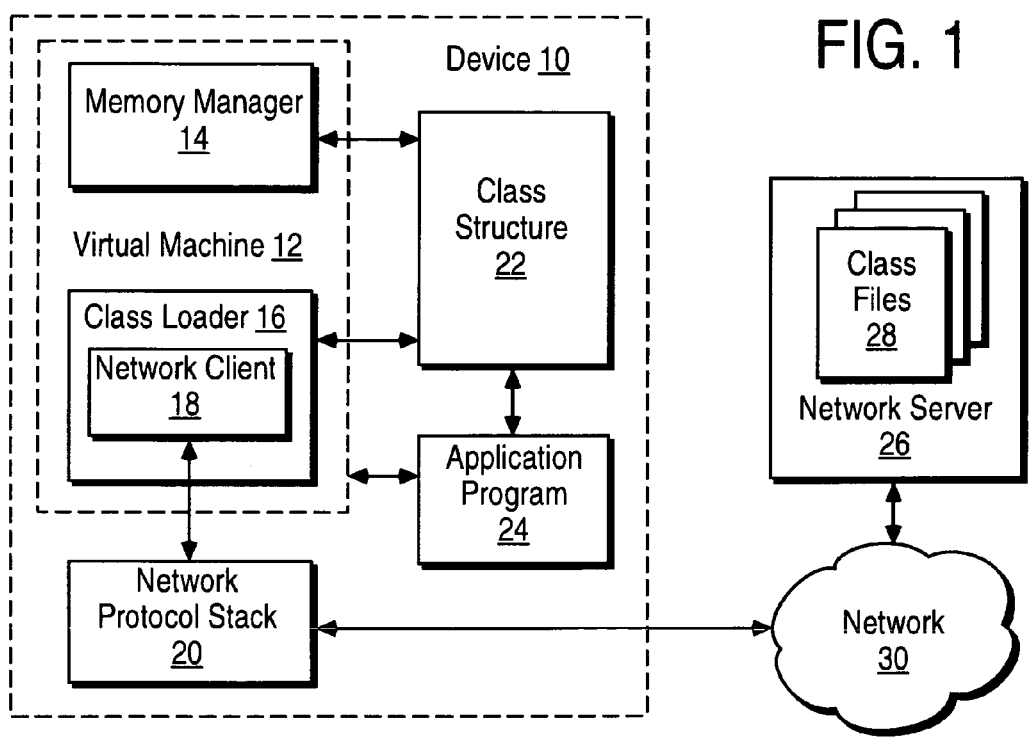
FIG. 1 shows a virtual machine that enables execution of application programs in a device having relatively limited resources.

FIG. 1 shows a virtual machine 12 that enables execution of an application program 24 in a device 10 having relatively limited resources. The limited resources of the device 10 may be characterized by limited or non existent file system resources. Alternatively or in addition, the limited resources of the device 10 may be characterized by limited memory resources.

The virtual machine 12 enables execution of one or more application programs such as the application program 24. The application program 24 is written to invoke one or more of a set of predefined classes that are supported by the virtual machine 12. The virtual machine 12 loads these predefined classes into a class structure 22 as needed during execution of the application program 24. In one embodiment, the predefined classes are Java classes and the virtual machine 12 is a Java virtual machine.

The virtual machine 12 includes a class loader 16 that reduces or eliminates the need for providing a file system in the device 10 by loading the predefined classes via a network 30. In one embodiment, the predefined classes are loaded from a set of class files 28 contained on a network server 26. In other embodiments, the class files 28 may be distributed among several network servers accessible via the network 30.

The class loader 16 includes a network client 18 for accessing the network server 26 and an underlying network protocol stack 20 for communicating with the network server 26 via the network 30. The particular protocol for communication between the network client 18 and the network server 26 is preselected so as to minimize development and/or manufacturing costs associated with the device 10. In one embodiment, the network server 26 is a hyper-text transfer protocol (HTTP) server and the network client 18 is an HTTP client. The network protocol stack 20 in this embodiment includes the TCP/IP layers and layers that provide communication according to the particular physical implementation of the connection to the network 30.

The HTTP protocol may be preferred in that it is widely used network prevalent protocol. As a consequence, HTTP client and network protocol stacks are readily available for a variety of platforms. This helps minimize the cost and reduce the development time and ease the implementation of the virtual machine 12 in a variety of devices. For example, the device 10 may be implemented using a platform in which HTTP client and underlying layers are readily available and need not be independently developed. Moreover, the relatively low cost and wide availability of existing HTTP servers offers additional advantages. For example, the network server 26 may be an existing HTTP server to which the class files 28 are added to support the device 10. This would eliminate the costs associated with installing a network server which is dedicated to providing class files to the device 10.

The virtual machine 12 includes a memory manager 14 that minimizes the amount of memory resources needed in the device 10 to hold the predefined classes being used for execution of the application program 24. The memory manager 14 monitors the classes stored in the class structure 22 and purges selected ones of the classes from the class structure 22 so as to provide optimal use of the memory resources in the device 10. In addition, the memory manager 14 monitors the classes stored in the class structure 22 and purges selected ones of the classes from the class structure 22 so as to minimize the amount of class loading performed via the network 30.

The device 10 represents any device which may benefit from the advantages provided by the virtual machine 12. This may include devices with relatively little or no file system resources and or minimal memory resources. The device 10 may be an embedded system. Examples of embedded systems include telephones, audio and video equipment, home appliances, and computer peripherals.

Figure 2:
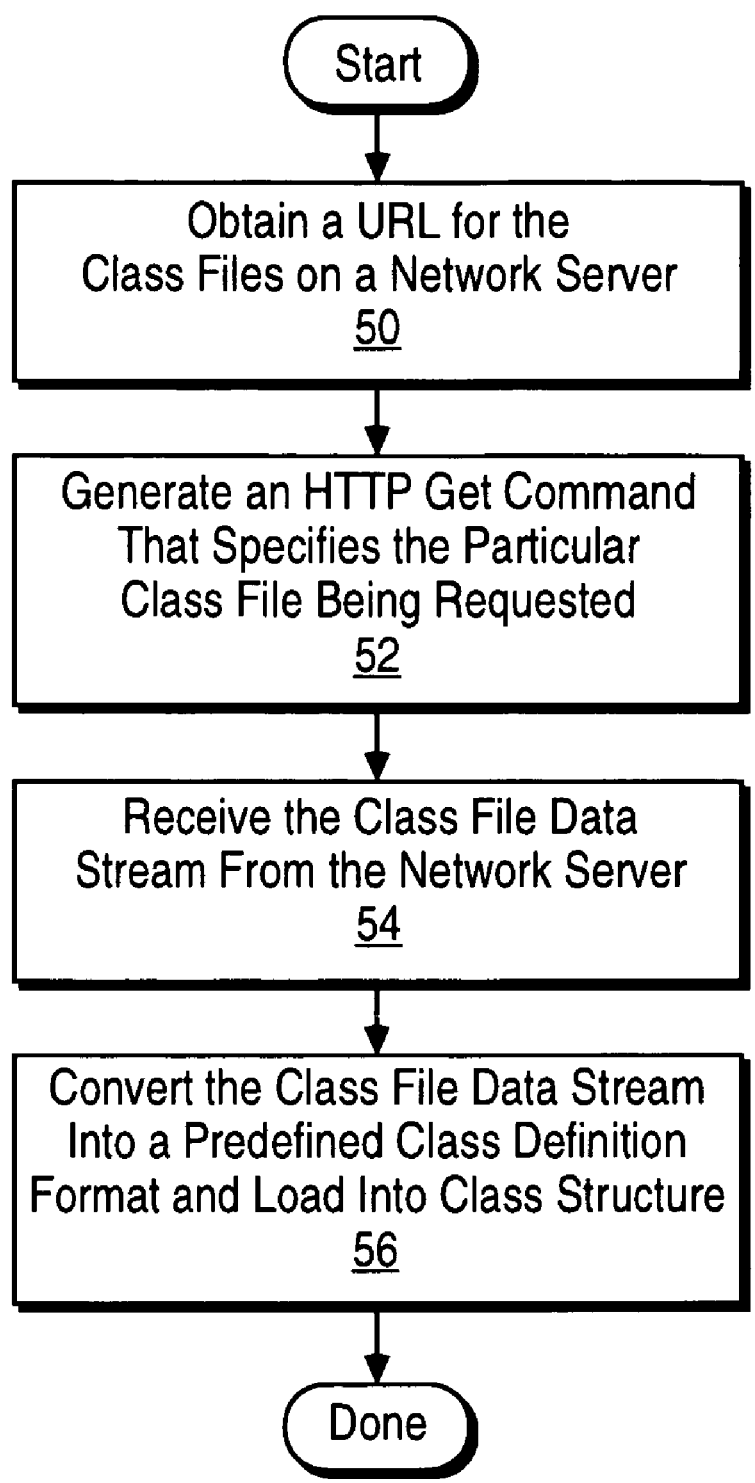
FIG. 2 shows one embodiment of a class loading method according to the present teachings.

FIG. 2 shows one embodiment of a class loading method implemented in the class loader 16. The steps shown are performed by the class loader 16 in response to a request by the virtual machine 12 to load a particular class of the predefined classes that support execution of the application program 24. The particular class may be, for example, a class having a method which is being invoked by the application program 24.

At step 50, the class loader 16 obtains a uniform resource locator (URL) for the network class files 28. In one embodiment, the appropriate URL or URLs for the network class files 28 are specified in one or more NETWORK CLASS PATH definition statements which are provided to the virtual machine 12. An example NETWORK CLASS PATH definition statement is as follows.

NETWORK CLASS PATH="netserver/80"

where "netserver/80" is a URL of the class files 28. The class files 28 are exported by the network server 26.

At step 52, the class loader 16 generates an HTTP GET command that specifies the particular class file being requested. The HTTP GET command is provided to the network client 18 which in turn issues the HTTP GET command to the network server 26 via the network protocol stack 20. An example of an HTTP GET command is as follows:

GET "netserver/80/foo.class"

where "foo.class" is the particular class being loaded, and "netserver/80" is a URL specified in a NETWORK CLASS PATH definition statement. If multiple URLs are specified in NETWORK CLASS PATH definition statements then the class loader 16 generates an HTTP GET command for each at step 52 until the particular class file is found. The multiple URLs may be sub-paths on one network server such as the network server 26 or pathnames for multiple network servers or any combination thereof.

In response to an HTTP GET command issued at step 52, the network server 26 returns a data stream containing the particular class file to the network client 18. The network client 18 provides the returned file data stream to the class loader 16 at step 54.

At step 56, the class loader 16 converts the class file data stream into a predefined class definition format and loads it into the class structure 22. In one embodiment, the predefined class definition format includes arrays and tables for storing methods and references or addresses to the methods in accordance with the Java object-oriented programming language. Thereafter, the virtual machine 12 may create instances of the newly loaded particular class for use by the application program 24.

Figure 3:
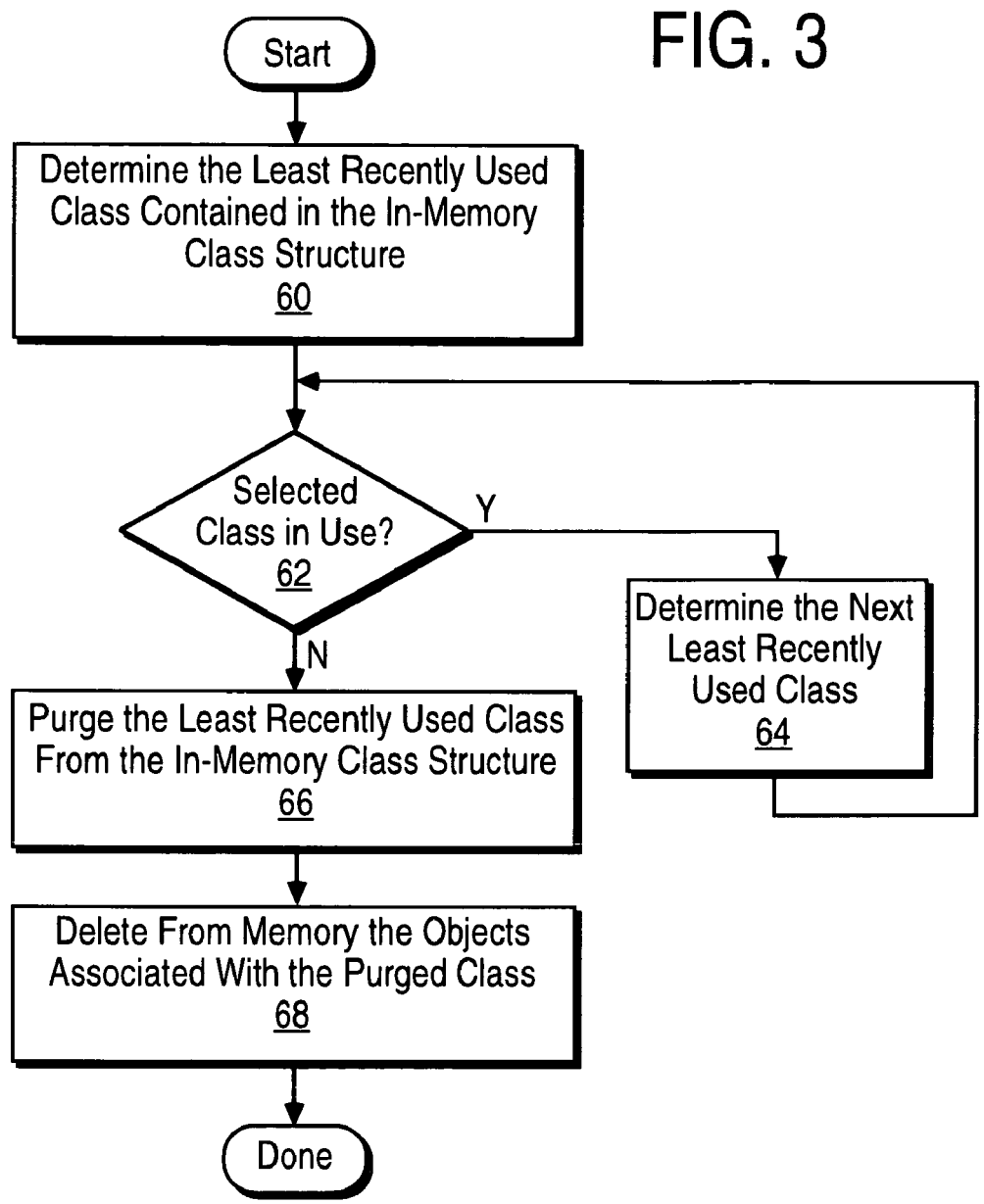
FIG. 3 illustrates a method for maintaining optimal use of the memory resources that store classes being used by application programs.

FIG. 3 illustrates one embodiment of a method implemented in the memory manager 14 for maintaining optimal use of the memory resources in the device 10 that hold the class structure 22. The methods steps shown may be performed periodically at predetermined time intervals such as during system idle periods. Alternatively or in addition, the methods steps shown may be performed whenever it is detected that the memory resources in the device 10 are below a predetermined threshold level of available memory.

At step 60, the memory manager 14 determines which of a set of classes currently stored in the class structure 22 is the least recently used class. The virtual machine 12 may associate a time value to each class contained in the class structure 22 that indicates a time at which an instance of the corresponding class was created. The memory manager 14 may select the least recently used class by selecting on oldest of these time values. Alternatively, count values or other metrics may be used to indicate a relative ordering of the creation of objects from the classes contained in the class structure 22.

The memory manager 14 selects the least recently used class as a candidate to purge from the class structure 22. In this embodiment, a purging of the least recently used class may minimize class loading via the network 30 because more recently used classes are more likely to be needed by the virtual machine 12 to create new objects. The need for subsequent class loading operations on the more recently used classes may be reduced if these classes are retained in the class structure 22. In other embodiments, other criteria for selecting classes as candidates for purging may be employed. For example, certain types of classes or classes that perform particular types of functions are known to be relatively infrequently invoked and may be selected at step 60.

At step 62, the memory manager 14 determines whether the class selected from step 60 is in use. The selected class is in use if it is associated with one or more objects being used by the application program 24. For example, if an object used by the application program 24 is an instance of the selected class then the selected class is in use for the purposes of step 62. Similarly, if an object used by the application program 24 is an instance of a subclass or a parent class of the selected class then the selected class is in use for the purposes of step 62. The virtual machine 12 may maintain a list that specifies the hierarchical associations, i.e. parent and child relationships, of the classes contained in the class structure 22. The memory manager 14 may use this list of associations to render the determination at step 62.

If the selected class is in use at step 62 then the memory manager performs step 64. At step 64, the memory manager 14 determines the next least recently used class and proceeds to step 62 to determine whether the next least recently used class is in use. The memory manager 14 loops through steps 62 and 64 until a candidate for purging is selected. The memory manager then proceeds to step 66 if an appropriate class can be selected.

At step 66, the memory manager 14 purges the class selected at step 60 or 64 from the class structure 22. At step 68, the memory manager 14 deletes objects from memory that are associated with the purged class. The virtual machine 12 may maintain a list of associations between the classes contained in the class structure 22 and instances of these classes, i.e. objects, contained in memory in the device 10. The memory manager 14 may use this list to locate objects to be deleted at step 68.

In an alternative embodiment, the memory manager 14 deletes the selected class and all of its associated objects regardless of whether the selected class is in use.

In addition, the memory manager 14 may provide a function for explicitly deleting one or more classes which is callable by application programs such as the application program 24. This enables an application program to clean up unneeded classes from memory. This helps prevent unneeded classes from cluttering what may be a relatively limited memory space in the device 10.

Figure 4:
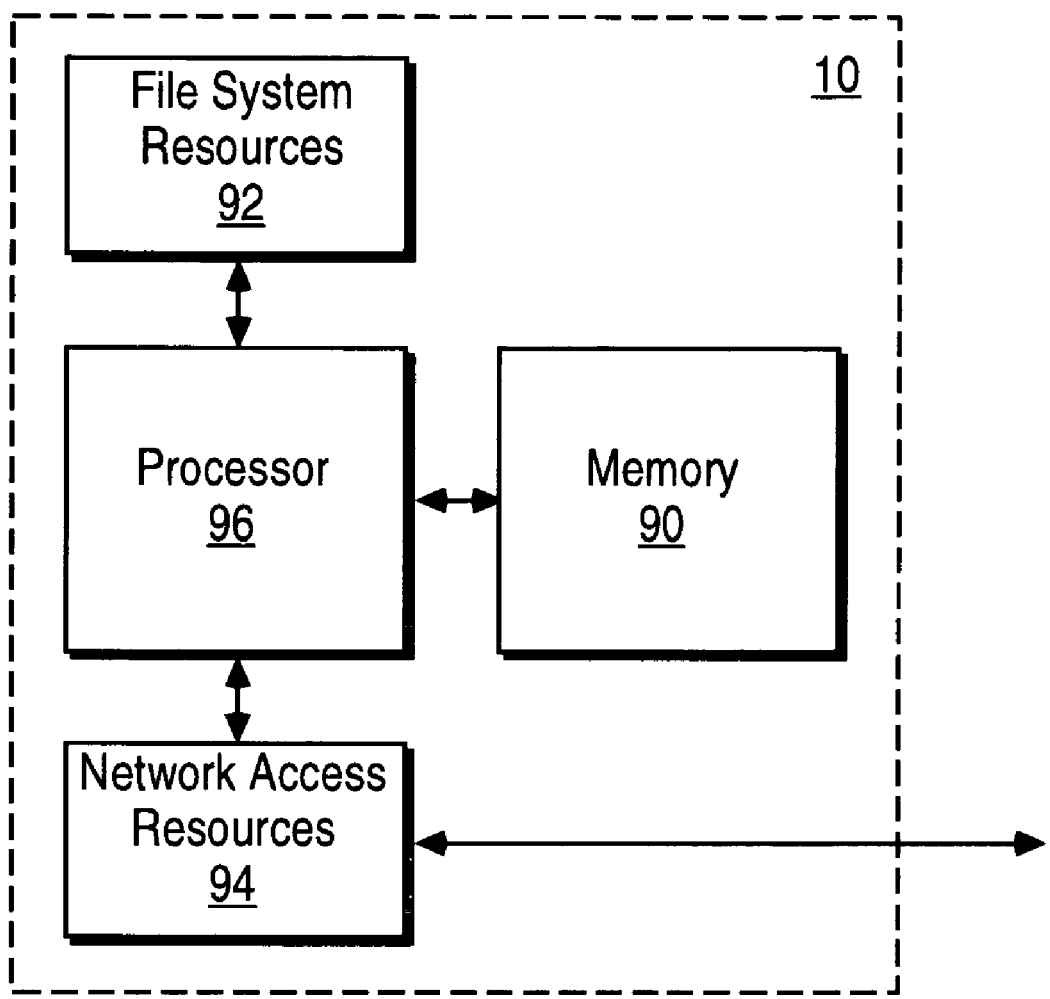
FIG. 4 shows an example hardware embodiment of a device that benefits from the teachings provided herein.

FIG. 4 shows an example hardware embodiment of the device 10 which includes a processor 96 for executing the virtual machine 12 and the application program 24 and other software or firmware associated with the device 10. The limited memory resources for holding classes that are being used by application programs is represented by a memory 90 which is a random access memory. The memory 90 holds the class structure 22 and may hold the application program 24 and/or elements of the virtual machine 12 as well as instances of classes including classes contained in the class structure 22. Alternatively, the application program 24 and/or elements of the virtual machine 12 may be stored in a persistent memory (not shown) in the device 10.

In this embodiment, the limited file system resources of the device 10 are represented by a set of file system resources 92. The file system resources 92 may represent elements such as magnetic media including rotating media or solid-state devices or other storage mechanisms. In other embodiments, the device 10 does not have any file system resources.

The device 10 also includes a set of network access resources 94. The network access resources 94 represent the appropriate hardware and software elements that enable communication via a network 30 using the hyper-text transfer protocol (HTTP). The physical communication path supported by network access resources 94 may be a communication link such as Ethernet, a wireless communication link including infrared, a radio link including cellular radio, or a serial or parallel communication link depending on the nature and cost constraints associated with the design of the device 10.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A virtual machine executed on a processor, comprising:
   class loader that enables the virtual machine to obtain a set of classes via a network as needed while executing an application program, the class loader converting the classes obtained via the network into a predefined class definition format and then storing the classes into a class structure in a memory such that the classes stored in the class structure are represented as a set of arrays and references of the predefined class definition format;
   memory manager that selects and purges the arrays and references of the classes from the class structure so as to minimize an amount of the memory consumed by the class structure and to minimize class loading activities on the network.

2. The virtual machine of claim 1, wherein the memory manager deletes a set of objects from the memory which are associated with the classes purged from the class structure.

3. The virtual machine of claim 2, further comprising a list of associations between the objects and the classes stored in the class structure such that the memory manager deletes the objects in response to the list.

4. The virtual machine of claim 1, wherein the memory manager selects a least recently used class in the class structure and purges the arrays and references of the least recently used class from the class structure if an instance of the least recently used class is not being used by the application program.

5. The virtual machine of claim 1, wherein the memory manager selects a least recently used class in the class structure and purges the arrays and references of the least recently used class from the class structure if an instance of the least recently used class or of a parent class or of a child class of the least recently used class is not being used by the application program.

6. The virtual machine of claim 5, further comprising a list of hierarchical associations among the classes in the class structure such that the memory manager determines whether the instances of the parent class or of the child class are not being used in response to the list.

7. The virtual machine of claim 1, wherein the memory manager purges the classes from the class structure at periodic times.

8. The virtual machine of claim 1, wherein the memory manager purges the classes from the class structure if an amount of available memory falls below a predetermined threshold level.

9. The virtual machine of claim 1, wherein the memory manager purges the classes from the class structure during system idle periods.

10. The virtual machine of claim 1, wherein the class loader obtains the classes from an HTTP server that exports a set of class files containing one or more of the classes.

11. The virtual machine of claim 10, wherein the virtual machine is provided with a class definition statement that specifies one or more URLs for the class files.

12. A method for class loading in a virtual machine, comprising the steps of:
    obtaining a set of classes via a network as needed while executing an application program;
    converting the classes obtained via the network into a predefined class definition format and then storing the classes into a class structure in a memory such that the classes stored in the class structure are represented as a set of arrays and references of the predefined class definition format;
    selecting an purging the arrays and references of the classes from the class structure so as to minimize an amount of the memory consumed by the class structure and to minimize class loading activities on the network.

13. The method of claim 12, further comprising the step of deleting a set of objects from the memory which are associated with the classes purged from the class structure.

14. The method of claim 12, wherein the steps of selecting an purging comprise the steps of:
    selecting a least recently used class in the class structure;
    determining whether an instance of the least recently used class is being used by the application program;
    purging the arrays and references of the least recently used class from the class structure if the instance is not being used.

15. The method of claim 14, wherein the step of determining whether an instance of the least recently used class is being used comprises the step of determining whether an instance of the least recently used class or of a parent class or of a child class of the least recently used class is being used by the application program.

16. The method of claim 12, wherein the steps of selecting and purging comprise the steps of selecting and purging the classes from the class structure at periodic times.

17. The method of claim 12, wherein the steps of selecting and purging comprise the steps of selecting and purging the classes from the class structure if an amount of available memory falls below a predetermined threshold level.

18. The method of claim 12, wherein the steps of selecting and purging comprise the steps of selecting and purging the classes from the class structure during system idle periods.

19. The method of claim 12, wherein the step of obtaining a set of classes via a network comprises the step of obtaining the classes from an HTTP server that exports a set of class files containing one or more of the classes.

20. The method of claim 12, further comprising the step of providing the virtual machine with a class definition statement that specifies one or more URLs for the class files.

21. A device, comprising:
memory that holds a class structure for storing a set of classes for use when executing an application program;
processor that executes a virtual machine including a class loader that when executed obtains the classes via a network as needed while executing the application program, the class loader converting the classes obtained via the network into a predefined class definition format and then storing the classes into the class structure such that the classes stored in the class structure are represented as a set of arrays and references of the predefined class definition format, the processor executing a memory manager that selects and purges the arrays and references of the classes from the class structure so as to minimize an amount of the memory consumed by the class structure and to minimize class loading activities on the network.

22. The device of claim 21, wherein the memory manager deletes a set of objects from the memory which are associated with the classes purged from the class structure.

23. The device of claim 21, wherein the memory manager selects a least recently used class in the class structure and purges the arrays and references of the least recently used class from the class structure if an instance of the least recently used class is not being used by the application program.

24. The device of claim 21, wherein the memory manager selects a least recently used class in the class structure and purges the arrays and references of the least recently used class from the class structure if an instance of the least recently used class or of a parent class or of a child class of the least recently used class is not being used by the application program.

25. The device of claim 21, wherein the processor executes the memory manager at periodic times.

26. The device of claim 21, wherein the processor executes the memory manager if an amount of available memory falls below a predetermined threshold level.

27. The device of claim 21, wherein the processor executes the memory manager during system idle periods.

* * * * *